United States Patent
Savalle et al.

(10) Patent No.: US 11,474,894 B2
(45) Date of Patent: *Oct. 18, 2022

(54) PARTIAL REROUTE OF TRAFFIC ONTO A BACKUP TUNNEL USING PREDICTIVE ROUTING

(71) Applicant: Cisco Technology, Inc., San Jose, CA (US)

(72) Inventors: Pierre-Andre Savalle, Rueil-Malmaison (FR); Jean-Philippe Vasseur, Saint Martin d'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 696 days.

This patent is subject to a terminal disclaimer.

(21) Appl. No.: 16/429,379

(22) Filed: Jun. 3, 2019

(65) Prior Publication Data
US 2020/0379839 A1  Dec. 3, 2020

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/076* (2013.01); *G06F 11/0709* (2013.01);
(Continued)

(58) Field of Classification Search
CPC ............. G06F 11/0793; G06F 11/0709; G06F 11/076; G06F 11/0706; G06F 11/0703; G06F 11/0754; G06F 11/0751; G06F 11/0769; G06F 11/0772; G06F 11/0781; G06F 11/1461
See application file for complete search history.

(56) References Cited

U.S. PATENT DOCUMENTS 9,853,882 B2   12/2017 Vasseur et al.
2015/0195192 A1*  7/2015 Vasseur ............... H04L 41/0836
                                          714/47.3
2015/0333953 A1   11/2015 Vasseur

OTHER PUBLICATIONS

European Search Report dated Aug. 31, 2020 in connection with European Application No. EP 20 17 6897.
(Continued)

*Primary Examiner* — Katherine Lin
(74) *Attorney, Agent, or Firm* — Behmke Innovation Group; Kenneth J. Heywood; Jonathon P. Western

(57) ABSTRACT

In one embodiment, a device predicts a failure of a first tunnel in a software-defined wide area network (SD-WAN). The device determines that no backup tunnel for the first tunnel exists in the SD-WAN that can satisfy one or more service level agreements (SLAs) of traffic on the first tunnel, were the traffic rerouted from the first tunnel onto that tunnel. The device predicts, using a machine learning model, that a backup tunnel for the first tunnel exists in the SD-WAN that can satisfy an SLA of a subset of the traffic on the first tunnel, in response to determining that no backup tunnel exists in the SD-WAN that can satisfy the one or more SLAs of the traffic on the first tunnel. The device proactively reroutes the subset of the traffic on the first tunnel onto the backup tunnel, in advance of the predicted failure of the first tunnel.

20 Claims, 12 Drawing Sheets

(51) Int. Cl.
    *G06N 20/00*     (2019.01)
    *H04L 12/28*     (2006.01)
    *H04L 12/46*     (2006.01)
    *H04L 41/5009*     (2022.01)
    *H04L 41/5025*     (2022.01)
    *H04L 45/28*     (2022.01)

(52) U.S. Cl.
    CPC ......... *G06N 20/00* (2019.01); *H04L 12/2854* (2013.01); *H04L 12/4633* (2013.01); *H04L 41/5009* (2013.01); *H04L 41/5025* (2013.01); *H04L 45/28* (2013.01)

(56) References Cited

OTHER PUBLICATIONS

U.S. Appl. No. 16/362,819, filed Mar. 25, 2019, Unpublished, Vasseur.
U.S. Appl. No. 16/392,825, filed Apr. 24, 2019, Unpublished, Wulff.
U.S. Appl. No. 16/425,093, filed May 29, 2019, unpublished, Vasseur.
U.S. Appl. No. 16/429,159, filed Jun. 3, 2019, Unpublished, Vasseur.

\* cited by examiner

PARTIAL REROUTE OF TRAFFIC ONTO A BACKUP TUNNEL USING PREDICTIVE ROUTING

TECHNICAL FIELD

The present disclosure relates generally to computer networks, and, more particularly, to the partial reroute of traffic onto a backup tunnel using predictive routing.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. However, tunnel failures in SD-WANs are relatively rare events, with potentially thousands of examples of normal behavior for each example of a failure. This imbalance in the available training dataset for the prediction model gives way to the potential for false positives to occur (i.e., the model incorrectly predicts a tunnel failure). These false positives can be quite costly, particularly if the traffic is rerouted onto a backup path/tunnel that does not offer the same performance as that of the original.

DESCRIPTION OF EXAMPLE EMBODIMENTS

Overview

Figure 1A:
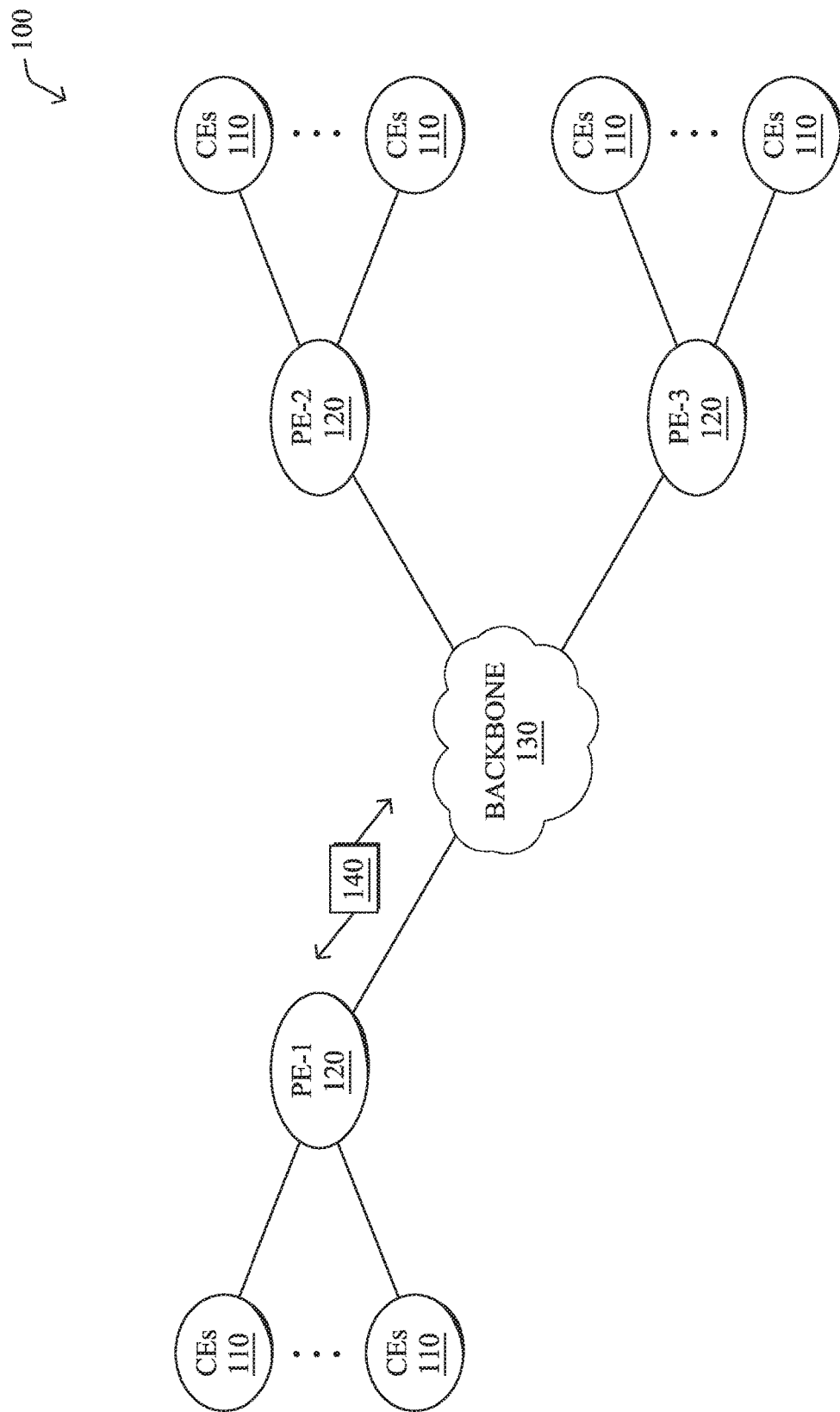
FIGS. 1A-1B illustrate an example communication network.

According to one or more embodiments of the disclosure, a device predicts a failure of a first tunnel in a software-defined wide area network (SD-WAN). The device determines that no backup tunnel for the first tunnel exists in the SD-WAN that can satisfy one or more service level agreements (SLAs) of traffic on the first tunnel, were the traffic rerouted from the first tunnel onto that tunnel. The device predicts, using a machine learning model, that a backup tunnel for the first tunnel exists in the SD-WAN that can satisfy an SLA of a subset of the traffic on the first tunnel, in response to determining that no backup tunnel exists in the SD-WAN that can satisfy the one or more SLAs of the traffic on the first tunnel. The device proactively reroutes the subset of the traffic on the first tunnel onto the backup tunnel, in advance of the predicted failure of the first tunnel.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
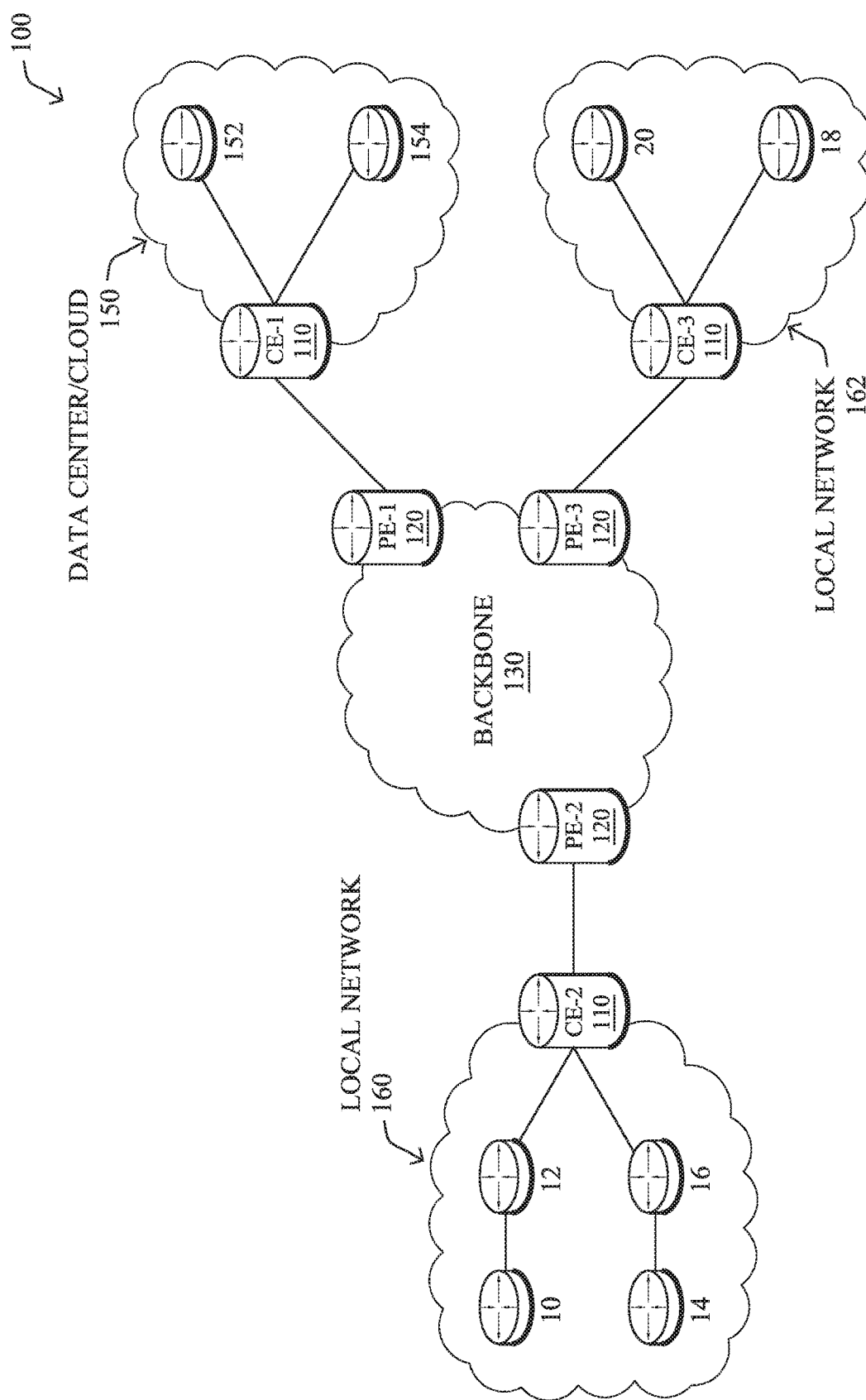

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
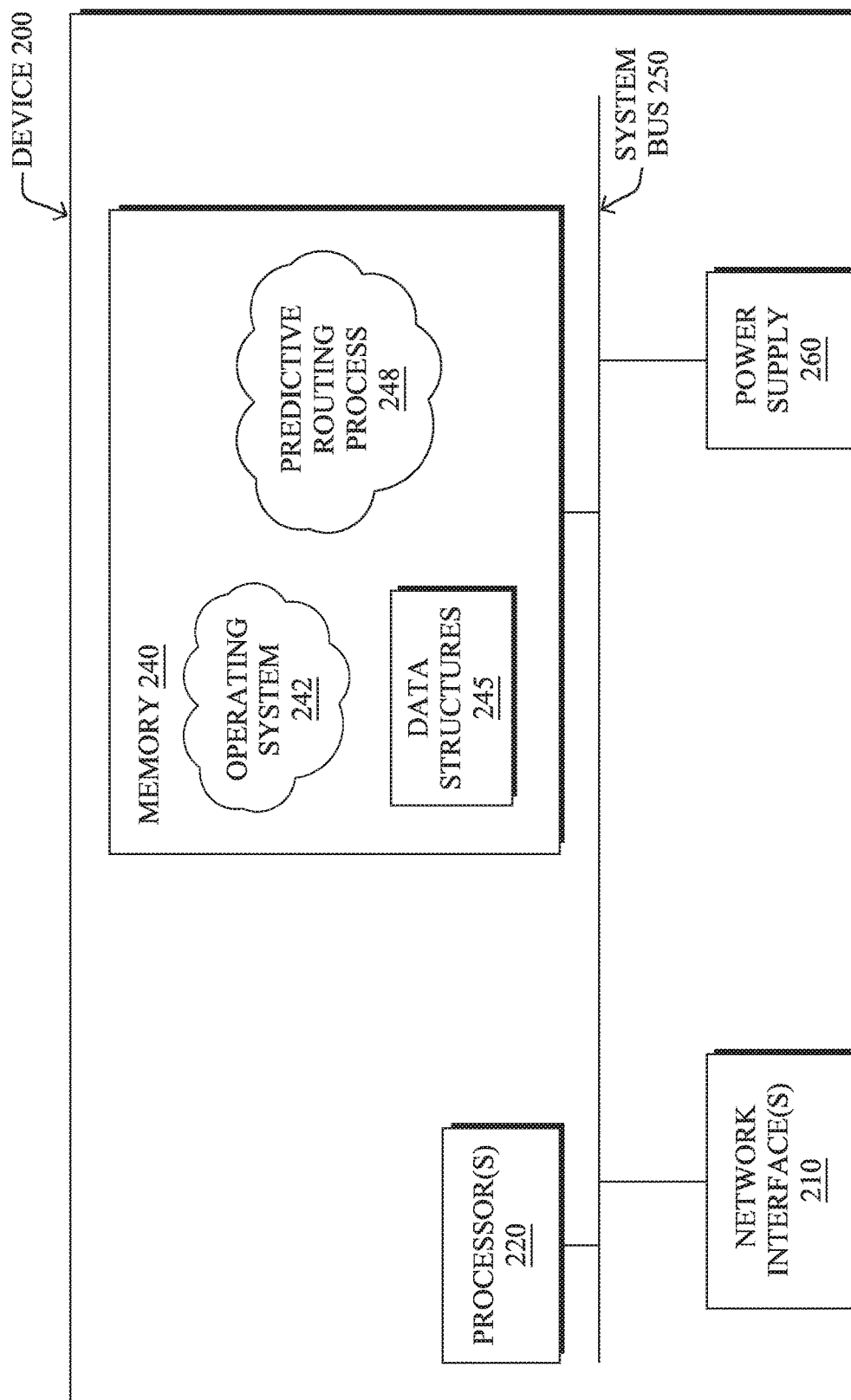
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, predictive routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
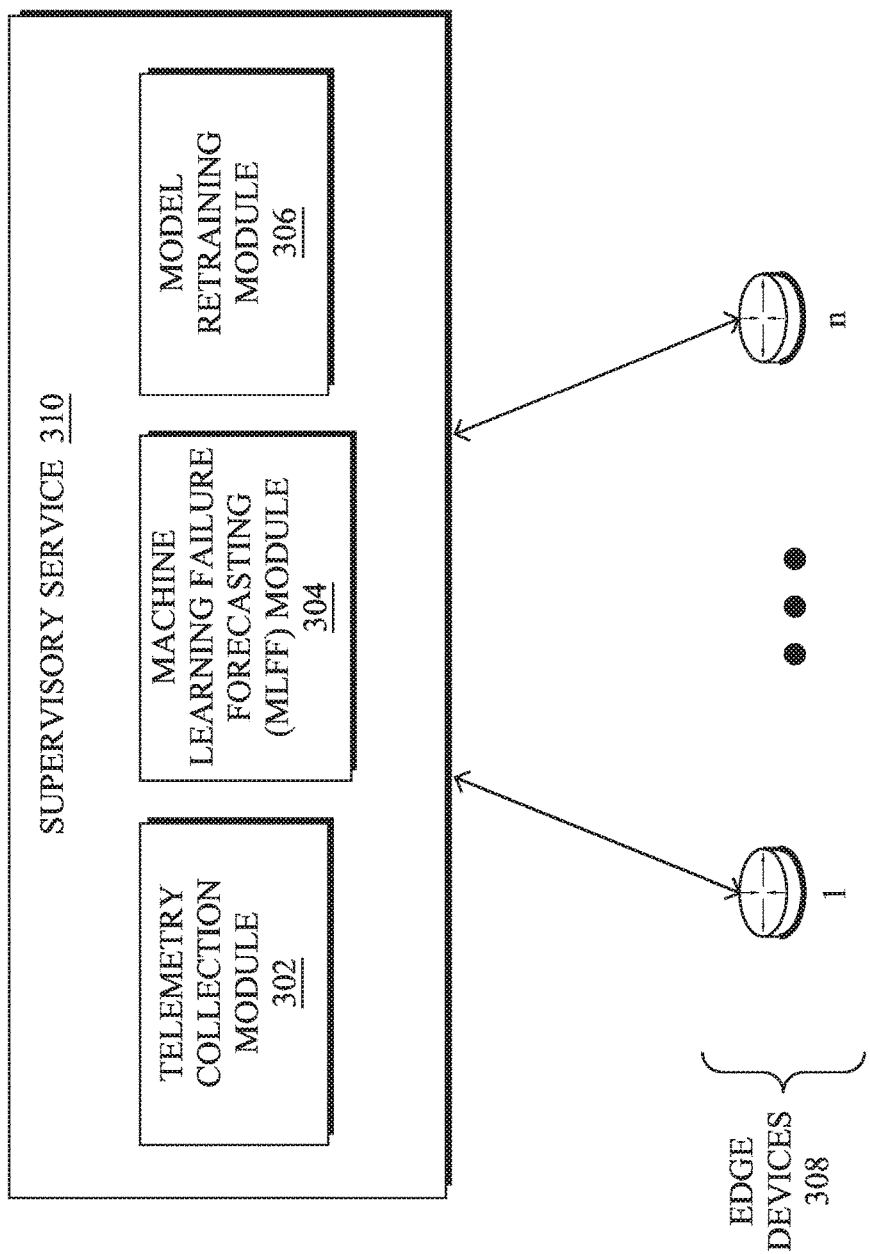
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through $n^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization<br>CPU Utilization<br>BFD Probe Latency, Loss and Jitter<br>Queue statistics (%-age drops for different queues) | Requested from head and tail edge routers. Periodically once every 1 second. |
| Interface down event<br>Rekey exchange failure<br>Router crash logs | Requested from both head and tail edge routers<br>Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are time-series models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting, e.g., according to the quality of service (QoS) policy. If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability $P_f$ (which can be a simple flag, a categorical variable (low, medium, high) or a real number). The device 308 may use $P_f$ to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4A:
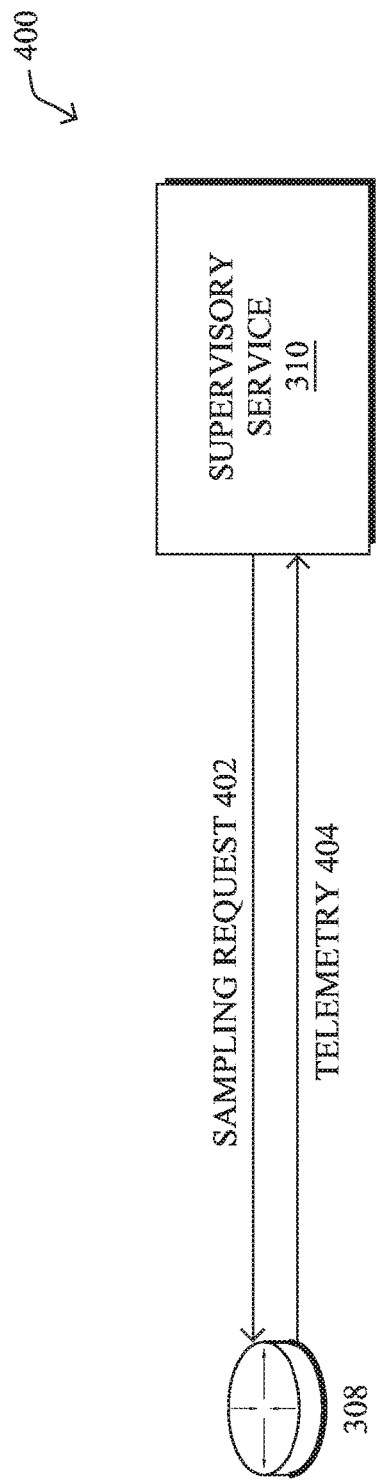
FIGS. 4A-4C illustrate examples of feedback for failure predictions.
Figure 4B:
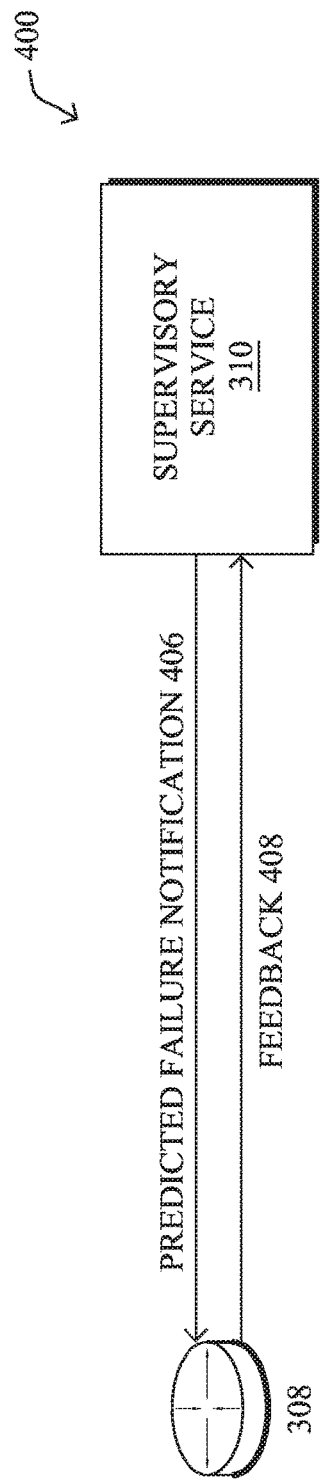
Figure 4C:
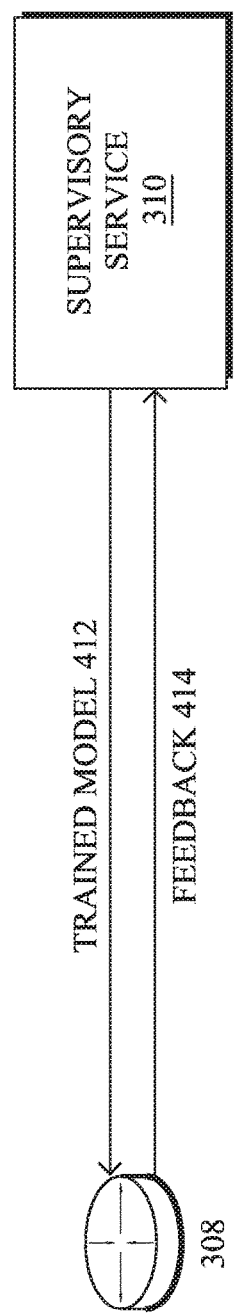

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when. Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from a element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, machine learning now makes predictive routing possible in SD-WANs and other networks by predicting path or tunnel failures before they actually occur. However, the forecasting of extreme events, i.e., those that occur very rarely, is still quite challenging due to the great imbalance in the dataset used for training and testing the predictive models. This imbalance is due to the fact that there are many more negative examples (e.g., from normal operation) than positive examples (e.g., from the extreme events). Notably, in SD-WANs, for every example of a rare event, there are thousands of normal samples that must be analyzed.

The key problem with imbalanced datasets is that even a small classification error can lead to very poor Precision-Recall Curves (PRCs). Indeed, given an imbalance of 1:1000, a classification error of 1% (i.e., a model with 99% accuracy) will lead to 10 false positives for every true positive, thus leading to only 10% precision. Testing has shown that SD-WAN tunnel failures occur roughly every 3.5 days on average, thus leading to an imbalance of 1:5000 for datasets sampled at one minute. As a result, to achieve 95% precision, a classifier must be trained that has at least 99.999% accuracy. Indeed, given 200 positives and 1,000,000 negatives (1:5000 ratio), an error rate of 0.001% will lead to 10 false positives and 200 true positives. Even with such incredible accuracy, the system will still generate about 7,200 false alarms per day for the deployment of 500,000 tunnels, out of 720 million total samples.

Partial Reroute of Traffic onto a Backup Tunnel Using Predictive Routing

The techniques herein allow what-if predictions to be made in a network that uses predictive routing, to evaluate the effects of rerouting traffic onto a backup path/tunnel. In some aspects, the techniques herein allow for the partial rerouting of traffic carried on a tunnel predicted to fail onto multiple secondary tunnels that the what-if prediction model predicts can offer an equivalent SLA to the rerouted traffic. Such a what-if prediction may also indicate the maximum amount of the traffic that a secondary/backup tunnel can convey while still meeting the required SLA.

Specifically, according to one or more embodiments herein, a device predicts a failure of a first tunnel in a software-defined wide area network (SD-WAN). The device determines that no backup tunnel for the first tunnel exists in the SD-WAN that can satisfy one or more service level agreements (SLAs) of traffic on the first tunnel, were the traffic rerouted from the first tunnel onto that tunnel. The device predicts, using a machine learning model, that a backup tunnel for the first tunnel exists in the SD-WAN that can satisfy an SLA of a subset of the traffic on the first tunnel, in response to determining that no backup tunnel exists in the SD-WAN that can satisfy the one or more SLAs of the traffic on the first tunnel. The device proactively reroutes the subset of the traffic on the first tunnel onto the backup tunnel, in advance of the predicted failure of the first tunnel.

Illustratively, the techniques described herein may be performed by hardware, software, and/or firmware, such as in accordance with the predictive routing process 248, which may include computer executable instructions executed by the processor 220 (or independent processor of interfaces 210) to perform functions relating to the techniques described herein.

Operationally, the core idea behind predictive routing relates to predicting/forecasting the failure of a link, node, tunnel, etc., so as to proactively reroute traffic onto a secondary/alternate/backup path. As noted above, this can be achieved by training a machine learning model to predict the failures, with the goal of the model training to maximize the recall of the model given a precision that meets or exceeds P_min, with P_min being close to 1.0. Indeed, a false positive of the model means that the predicted failure does not actually occur. Similarly, a false negative of the model means that the model failed to predict an actual failure. In general, false negatives are less problematic, as existing reactive routing mechanisms can still be used to reroute the traffic after the failure is detected. On the other hand, false positives can be quite problematic, since traffic may be rerouted onto secondary paths offering a lower SLA for the traffic, even though the primary tunnel did not fail. This is why high precision is desirable for failure prediction modeling, especially in the case of very unbalanced datasets.

A key aspect of the techniques herein is to mitigate the negative effects of a false positive by ensuring that the traffic is rerouted onto a secondary path/tunnel that offers a similar QoS as that of the original. In such a case, if the system incorrectly predicts a failure and reroutes the traffic onto a secondary path/tunnel, the effects are greatly mitigated, making false positives by the prediction model less of a concern.

Note, however, that traffic is typically highly sensitive to jitter. Thus, switching traffic onto a backup path is not completely innocuous, since this may cause jitter to increase and lead to packet re-ordering, if there is a high delta in delays between the primary and backup tunnels. In order to address that potential concern, a policy rule may be used to specify the type of traffic eligible for pro-active rerouting due to a predicted failure, as well as whether the traffic should only be switched if an equivalent backup tunnel is found. In this context, an "equivalent" secondary tunnel is one that offers an SLA that meets the SLA requirements of the traffic to be rerouted.

While the ideal outcome of predictive routing is to reroute application traffic onto a backup tunnel that offers an equivalent SLA as that of the primary tunnel, prior to the primary tunnel failing, this is not always possible. Indeed, there are often cases in which no equivalent backup/secondary path is available for the traffic. However, one observation is that it may still be possible to divide up the application traffic and reroute it onto multiple backup paths, while still satisfying the SLA of the traffic.

Figure 5:
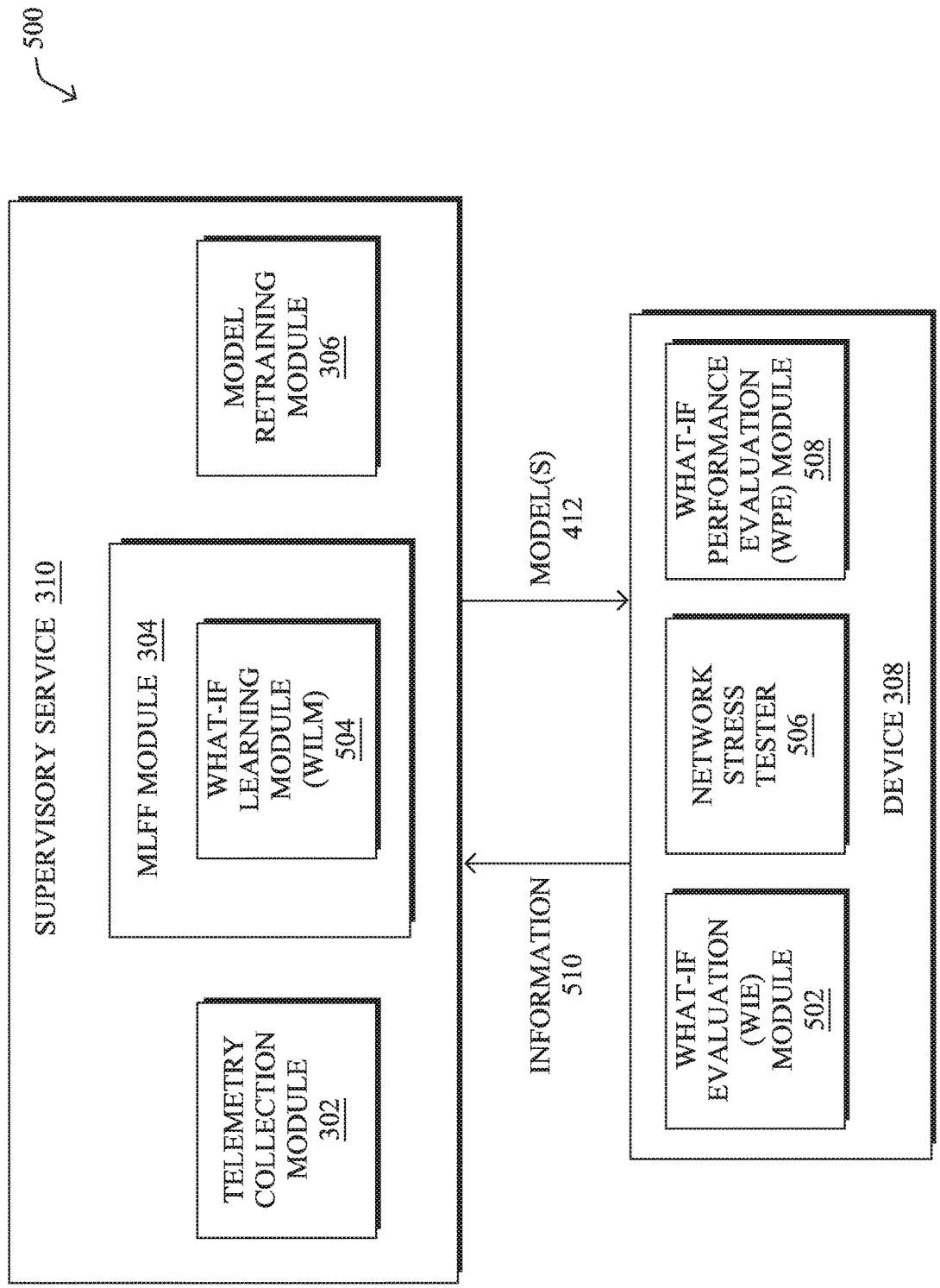
FIG. 5 illustrates an example architecture for the partial rerouting of traffic onto backup tunnels using predictive routing.

FIG. 5 illustrates an example architecture 500 for the partial rerouting of traffic onto backup tunnels using predictive routing, according to various embodiments. Continuing the example of FIG. 3, architecture 500 may include any or all of the components of architecture 300 with the following additions, to provide a service to the network: a what-if evaluation (WIE) module 502, a what-if learning module 504, a network stress tester 506, and/or a what-if performance evaluation (WPE) module 508. As would be appreciated, the various components shown may be combined or omitted, as desired. Further, these components can be executed either locally on a particular device or implemented in a distributed manner, in various cases. In the distributed case, the set of executing devices can also be viewed as a single device, for purposes of implementing architecture 500.

As shown, what-if evaluation (WIE) module 502 may be configured to predict the SLA of various (critical) applications for a backup link/tunnel, given an increase in overhead on the backup tunnel that is attributable to rerouting traffic from another link/tunnel onto the backup. In a further embodiment, WIE module 502 may also be configured to predict the SLA on the current link/tunnel, should traffic be increased on that link/tunnel, such as when new traffic is added. Typically, WIE module 502 may be executed locally on a device 308, such as an edge router, to allow the router to proactively reroute traffic away from its current tunnel, before that tunnel can no longer meet the SLA of the traffic (e.g., when the tunnel is predicted to fail, when the performance of the tunnel is predicted to degrade, etc.). However, further embodiments provide for WIE module 502 to be executed on another device and its predictions sent to device 308, as needed.

In some embodiments, WIE module 502 may represent the traffic of the primary tunnel as a probability distribution, considering various variations. For example, in the previous case above, WIE module 502 may collect instantaneous throughput values for Office365 traffic over the last half-hour, to build an empirical probability distribution representing the traffic for that application. If there is a lot variability in the traffic, this may be a more precise representation of the traffic that will need to be handled by the backup tunnel rather than a single point estimate such as the mean or max would be.

The role of WIE module 502 is then to estimate the SLA for the backup tunnel when charged with traffic described by that probability distribution. In various embodiments, WIE module 502 achieves this using one or more machine learning models. In one embodiment, the model is trained in the cloud (e.g., by supervisory service 310), based on information 510 pushed by the various edge devices 308. Regularly, the machine learning model is re-trained, either from scratch or incrementally, and the updated model, such as model 412, is pushed back to the WIE module 502 on each of the edge devices. In other words, in addition to MLFF module 304 training a failure prediction module 412 to predict tunnel failures, MLFF module 304 may also train a what-if model 412 to predict the effects of rerouting traffic from the tunnel predicted to fail onto one or more backup tunnels. Optionally, WIE module 502 can carry out additional training steps, starting out from the general what-if model 412 pushed from the cloud. This is usually referred to as "fine-tuning" in the machine learning literature and can allow the local model on device 308 to be personalized to the fine-grained patterns specific to edge device 308.

The nature of the tunnel, as well as the network configuration, are essential to predicting the SLA under various traffic conditions. To this end, WIE module 502 on each edge device, such as device 308, may report the following information 510 to supervisory service 310 for machine learning model training by what-if learning module (WILM) 504:

The traffic conditions X at regular time steps and for each tunnel (e.g., packet timing information, packet sizes, etc.).

The corresponding observed SLAs Y, at regular time steps and for each tunnel.

Contextual information C about the edge device and each of the tunnels.

The contextual information in information 510 includes information about configuration on the edge device 308 (e.g., routing, QoS), as well as on each of the tunnels, such as the type of the transport, corresponding ISP, geographical locations of the endpoints, information about the amount of bandwidth provisioned with the ISP when available, etc. As would be appreciated, C is a critical aspect of the techniques herein. Indeed, in many circumstances, the model used to predict outcomes for 'what-if scenarios' is highly dependent on the context. For example, consider the case of a Service Provider (SP) providing Internet connectivity. Typically, SPs adopt different strategies in terms of network engineering, over-booking ratios, QoS mechanisms, policy enforcement, and the like. Thus, providing the context as part of information 510 is critical for the training of an accurate what-if prediction model 412, and such context will be used as feature inputs to what-if learning module 504.

As shown, what-if learning module (WILM) 504 receives information 510 pushed by the WIE modules 502 on the edge device(s) 308, trains the machine learning models (e.g., model 412), and pushes the trained models to the edge device(s) 308 for use by the WIE modules 502. In its simplest embodiment, the WILM 504 trains a machine learning model 412 that directly predicts the output required by WIE module 502. For example, WILM 504 may trains model 412 to predict SLA violations for different applications. A large range of statistical and machine learning models can be used: linear or kernelized models, tree-based models such as gradient boosted regression trees (GBRTs) or Random Forests, or higher capacity models such as neural networks. Generally, most methods amenable to regression or classification can be used, although it is best if the model 412 allows deriving uncertainty estimates for use by active learning module 508, detailed below, such as Bayesian methods (e.g., Gaussian processes, etc.). More formally, WILM 504 trains the model(s) 412 using $(X_t, C_t)$ as feature vectors, and $Y_t$ as target values.

Many of the contextual features in information 510 are categorical. For instance, the SP or geographical regions of the tunnel endpoints. These can be treated by WILM 504 using an approach such as one-hot encoding. However, this fails to capture the structure and relationships between the modalities. In a further embodiment, WILM 504 may instead use ad-hoc modeling for each such feature (e.g., weight sharing, structured sparsity).

To tune and adjust model(s) 412, WILM 504 may split information 510 into different dataset such as a training dataset, a testing dataset, and/or a validation dataset. Because of the temporal nature of this data, random splits can lead to contamination and specific splitting strategies should be used by WILM 504. In one embodiment, WILM 504 may designate the most recent data from information 510 for testing and validation. In another embodiment, WILM 504 may hold out information 510 for certain specific tunnels, possibly using stratified samples of variables such as ISP, location and nature of the tunnel/transport, etc. Both techniques can also be combined, in a further embodiment.

According to various embodiments, a key aspect of the techniques herein is that WILM 504 may train the what-if model 412 to identify the largest block/set of traffic that can be rerouted through a particular backup tunnel without violating the SLA of the traffic. For instance, it may not be possible to reroute all of the traffic onto the backup tunnel, but maybe the VoIP traffic on the primary tunnel predicted to fail can be sent to the backup tunnel without any SLA degradation for that class of traffic. Similarly, it may even be possible to reroute both VoIP and Office365 onto the backup tunnel, even if these have two different SLAs.

How to determine those blocks of traffic depends on the specifics of the machine learning model 412 learned by WILM 504 and pushed to W E module 502 for execution. If the what-if model 412 is some sort of linear model (or a slightly non-linear model), WILM 504 can use optimization techniques. For example, in the simple case in which the what-if model 412 is a linear model, the output SLA metrics vector is predicted as $$Y = AX$$

where X is the input feature vector and A the model. If the full traffic on the primary tunnel is represented by X, linear or quadratic programming can be used to find a traffic vector $\underline{T}$ according to:

maximize AmountOfTraffic($\underline{T}$)

over traffic vectors $\underline{T}$ such that $\underline{T} <= X$ and $A\underline{T} <= S$.

Here, AmountOfTraffic is a linear or quadratic function measuring the amount of traffic the system can reroute. For instance, it can be the SUM of all the throughputs. S is a vector with maximum values for each predicted SLA characteristics. This is trivially extended to SLA characteristics where higher is better using the appropriate linear constraints.

In the above formulation, fractional quantities of each traffic type or application can be selected, which may be difficult for routing. In another embodiment, binary/mixed-integer programming can be used to force the selection of all or none of the traffic for each application. In this case, AmountOfTraffic may compute the number of applications selected, or a mixture of that and of the sum of the throughputs. AmountOfTraffic can also use different weights for different applications to reflect relative importance when trying to reroute part of the traffic to secondary tunnels.

If the what-if model 412 is more general and not amenable to the previous techniques, black-box optimization techniques can also be used.

In one embodiment, the what-if model 412 may leverage successive ablation:

First, predict SLA characteristics for the full traffic to reroute to the backup tunnel.

If these are unacceptable, attempt to remove each application or traffic type from X, start with the least critical ones, and predict the corresponding SLA characteristics.

Process recursively that tree, for instance exploring nodes with the most promising SLA characteristics (i.e., closer to the requirements) first.

Along with some pruning rules to stop exploring some branches (e.g., when the amount of traffic left is too small), the above approach produces a set of traffic profiles along with the corresponding SLAs. All the traffic profiles with predicted SLAs meeting the requirements can then be sorted according to AmountOfTraffic or some other measure of importance.

In another embodiment, the what-if model 412 could use a greedy algorithm that operates by adding more and more traffic to an initially empty traffic vector.

Linear programming and fully black-box optimizations are only two extremes, and intermediate solutions can usually be worked out based on specifics of the machine learning models used.

When a tunnel is predicted to fail, either by supervisory service 310 or locally at device 308, a call may be made to WIE module 502 to use its trained what-if model 412 to determine whether an equivalent tunnel can be found to pro-actively reroute part of the traffic. If no backup tunnel is predicted as able to withstand even a small portion of the primary tunnel's traffic, WIE module 502 may decide to not proactively reroute the traffic at all. Indeed, rerouting traffic to a tunnel that would degrade the QoS may be undesirable, especially if the predicted tunnel failure event is a false positive. However, in the presence of multiple secondary tunnels, as is common in most SD-WANs, the evaluation by WIE module 502 may be generalized to all potential secondary tunnels. In this case, the output of WIE module 502 may take the following form:

Tunnel ID, closest_match_1
Tunnel ID, closest_match_2
. . .

In one embodiment, the closest match may be driven by the priority of the traffic eligible for proactive routing (e.g. on may give highest priority for traffic of type X, versus traffic of Type Y as specified per policy). In another embodiment, no priority may be specific but closest match may be used to maximum the amount of traffic that should be pro-actively rerouted, etc. In yet another embodiment, WIE module 502 may use historical failure analysis to give higher preference to traffic that has been mostly impacted by failures in the past.

Once device 308 has determined that the primary tunnel is predicted to fail, and that an equivalent backup tunnel is not available, it may partially and proactively reroute the traffic to a set of backup tunnels according to their closest match. Such a closest match may specify the type of traffic that could be carried by each potential secondary path. In addition, device 308 could use any number of different routing strategies, to perform per-flow, per-packet load balancing.

Figure 6A:
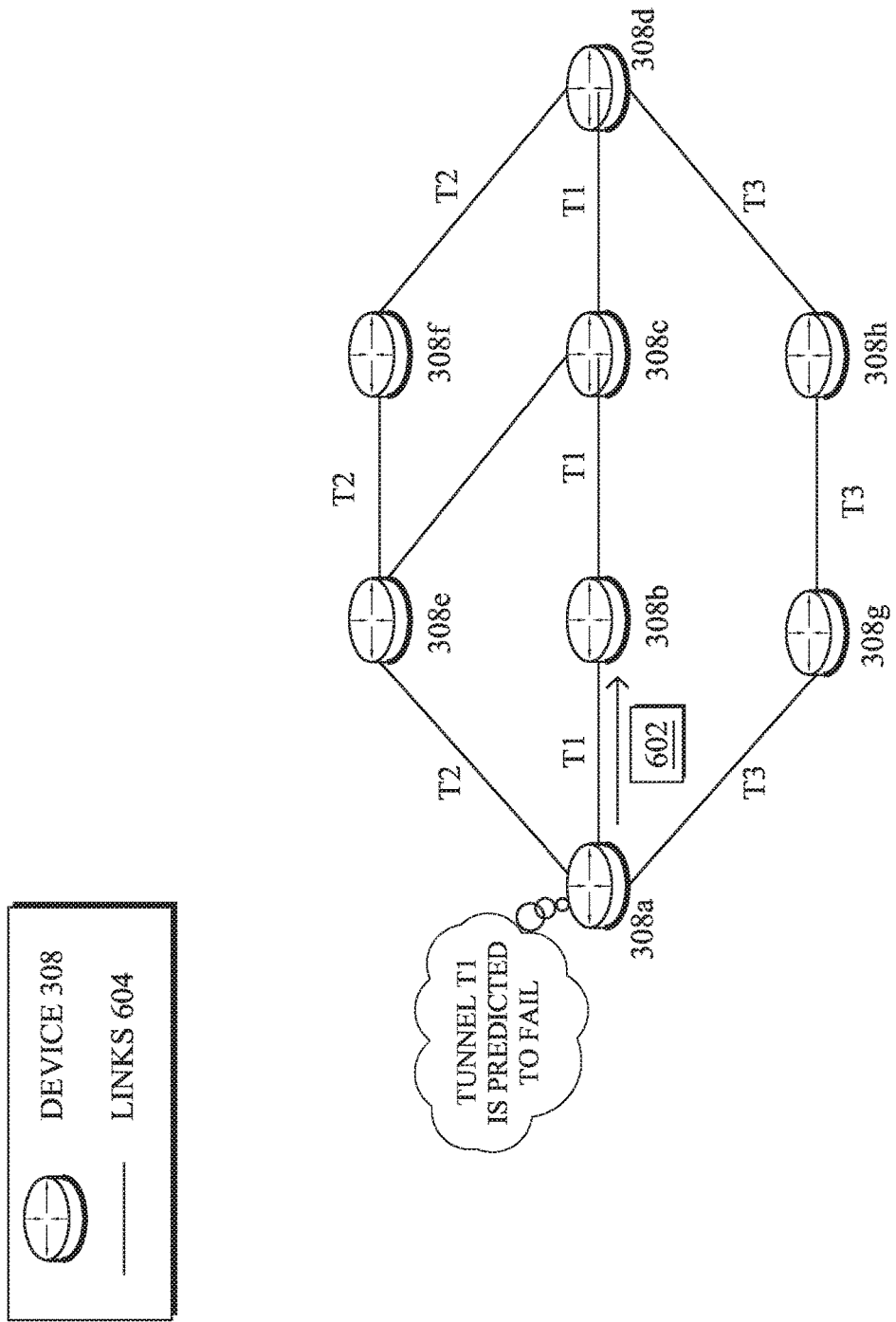
FIGS. 6A-6D illustrate examples of performing predictive routing in a network.

By way of example, FIGS. 6A-6D illustrate examples of performing predictive routing in a network according to various embodiments. As shown in FIG. 6A, a plurality of devices 308a-308h are interconnected by links 604 and a tunnel T1 connects a head-end device 308a with a tail-end device 308d. Further, assume that device 308a implements a predictive routing service in the network, either by executing a failure prediction model directly or by communicating with a centralized service that executes the model. For example, such a model may predict that tunnel T1 is likely to fail, thereby impacting traffic 602 on the primary tunnel T1.

According to various embodiments, the predictive models employed to make predictive routing decisions may also perform what-if scenario predictions. In other words, the models may not only predict a failure of tunnel T1, but also assess whether rerouting the traffic 602 sent via tunnel T1 onto the backup tunnel T2 or tunnel T3 will satisfy the SLA associated with traffic 602. To do so, device 308a may perform what-if testing of tunnel T2, to obtain training data for the model. Such testing allows the what-if model to answer the question "if traffic 602 is rerouted onto a particular backup tunnel, would that backup tunnel satisfy the SLA of traffic 602?"

Figure 6B:
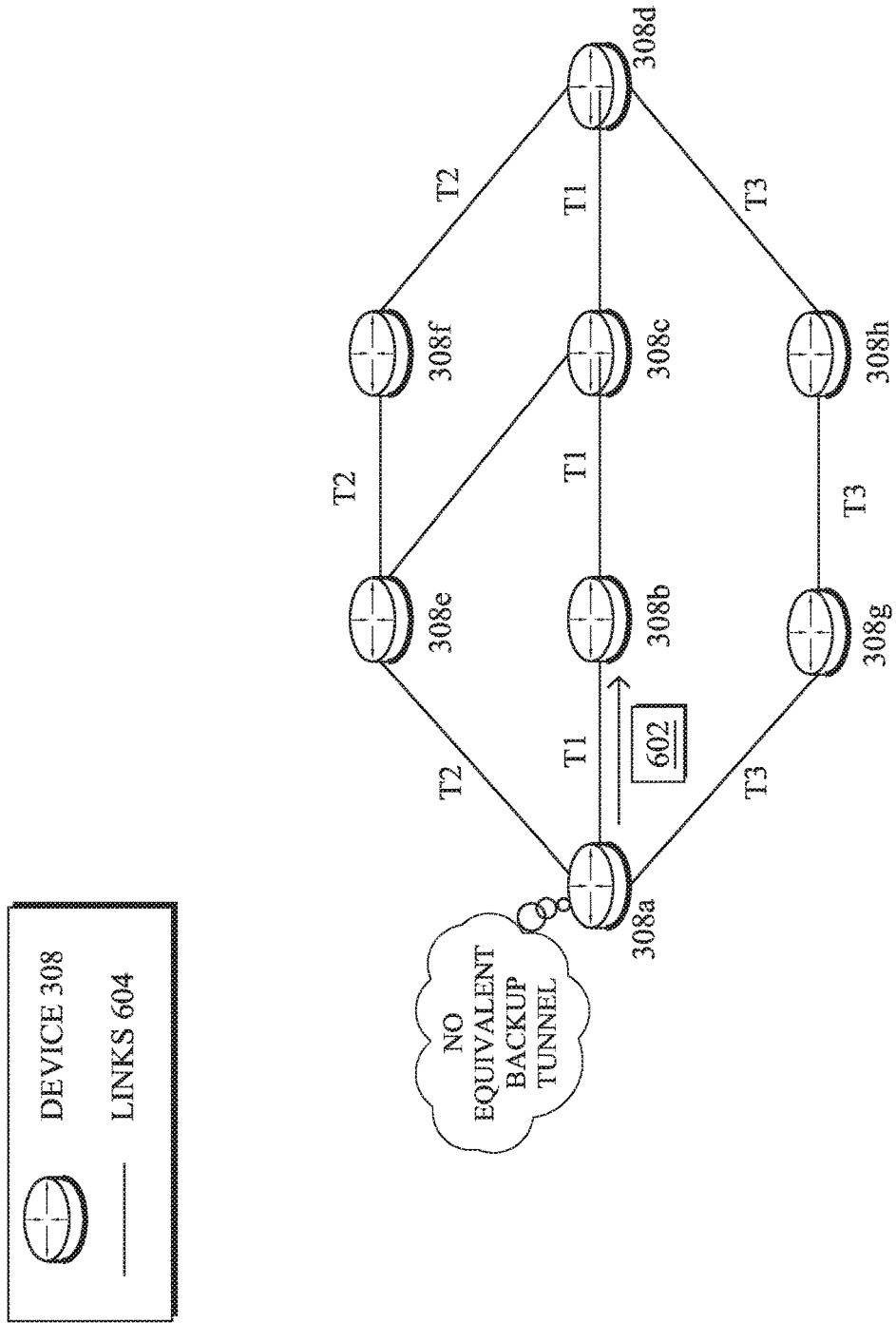

As shown in FIG. 6B, assume that the what-if model determines that there are no backup tunnels available that are equivalent to tunnel T1. In other words, the what-if model may assess the backup tunnel(s) for the primary tunnel T1, such as tunnels T2 and T3 shown, to determine whether rerouting traffic 602 onto any of those tunnels will satisfy the SLA(s) of traffic 602. Here, it may be the case that neither backup tunnel T2 nor backup tunnel T3 can satisfy the SLA(s) of traffic 602 due, for example, to the existing traffic already on these tunnels. Of course, if T2 or T3 is predicted to accommodate the SLAs of traffic 602, device 308a may simply reroute traffic 602 onto that tunnel, prior to the predicted failure of tunnel T1.

Figure 6C:
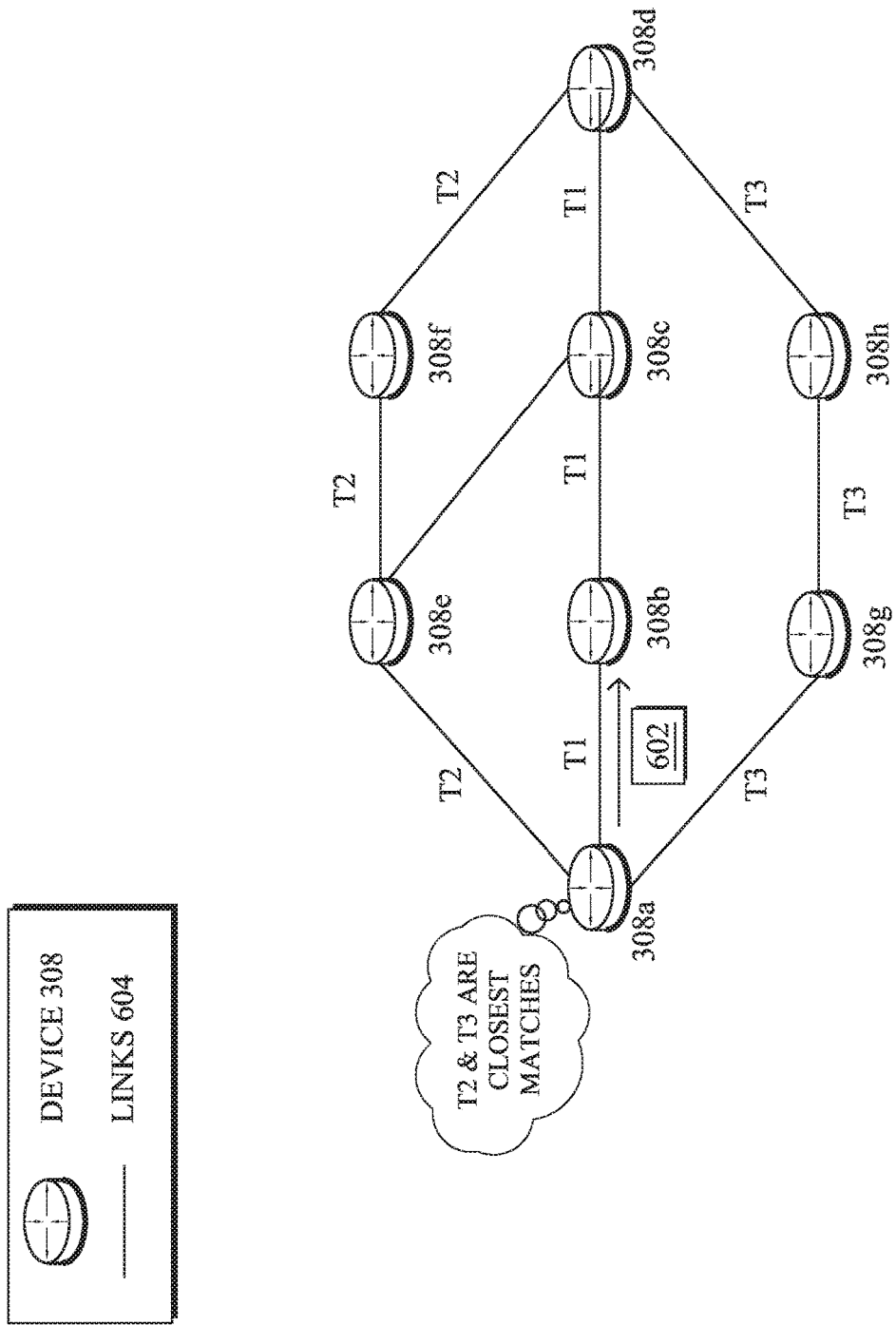

In FIG. 6C, the what-if model may identify the backup tunnels T2 and T3 as being the closest matches for tunnel T1, meaning that these tunnels are still predicted to be able to satisfy the SLA of at least a portion of traffic 602 (e.g., a subset of traffic 602). For example, assume that traffic 602 comprises application traffic for a voice application, Common Internet File System (CIFS) application traffic, and. Office365 application traffic.

in one embodiment, using the techniques above, the what-if model may determine that tunnel T2 is the closest match to that of T1 and can handle 75% of traffic 602, without violating the SLA of the rerouted traffic. Similarly, the model may determine that tunnel T3 is the next closest match and can handle the remaining 25% of traffic 602.

In another embodiment, the what-if modeling may also take into account priorities assigned to the various types of applications associated with traffic 602. For example, assume that the voice application traffic in traffic 602 is given the highest priority, followed by the CIFS traffic, and, lastly, the Office365 traffic. In such a case, the what-if model may assess whether backup tunnel T2 and/or T3 could satisfy at least the SLA of the voice application traffic, the SLA(s) of both the voice and CIFS traffic, etc. For example, even though T2 may be predicted to be unable to satisfy the SLAB of traffic 602 as a whole, it may nonetheless be able to satisfy the SLA of the voice application traffic in traffic 602, were it rerouted onto T2. In a further embodiment, this prioritization of the applications may be dependent on the historical impact of tunnel failures on the traffic. For example, if Office365 traffic has demonstrated a history of being highly impacted by tunnel failures in the past, its priority may be increased for purpose of attempting to reroute it from T1.

Figure 6D:
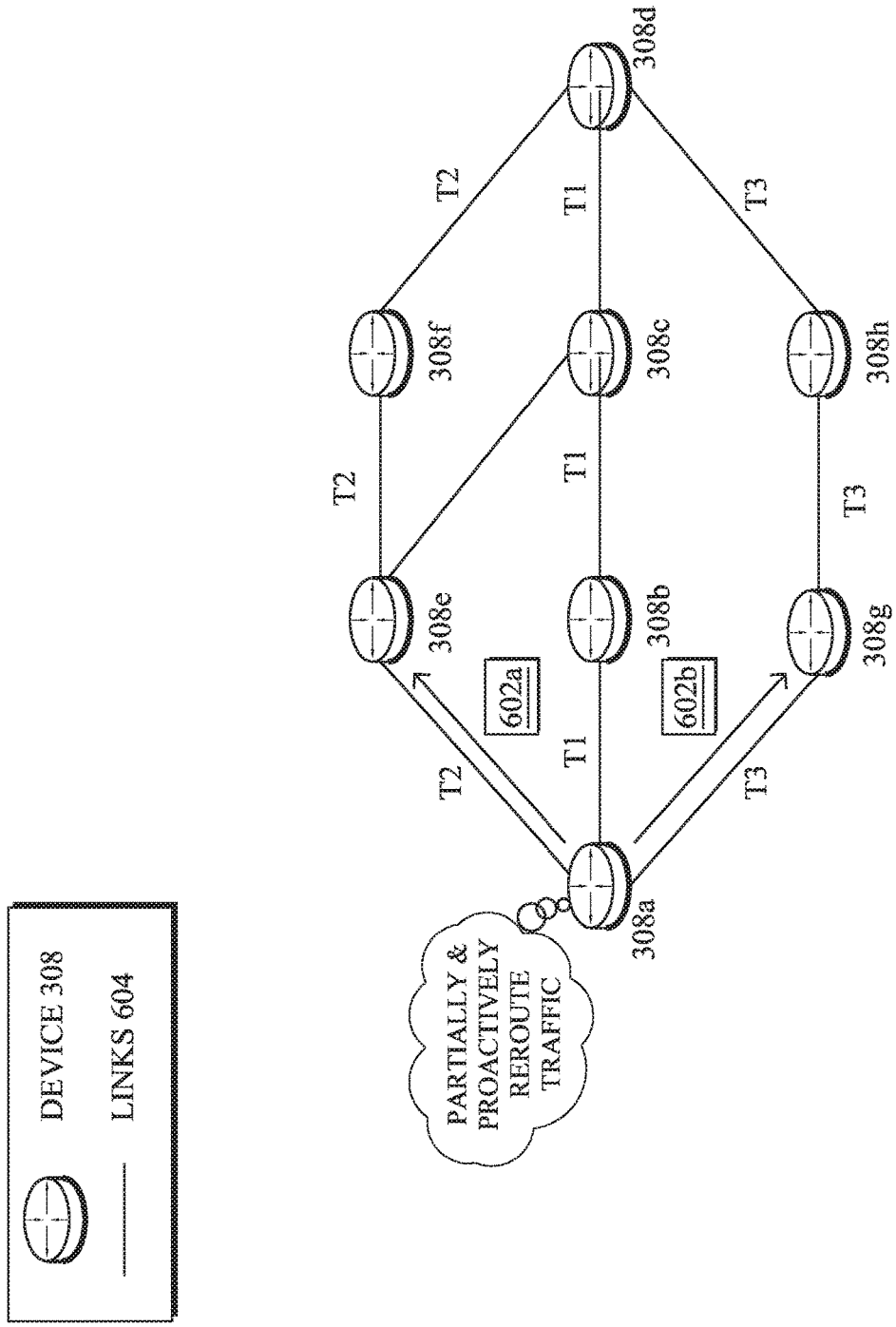

As shown in FIG. 6D, based on the above analysis, device 308a may reroute portion/subset 602a of traffic 602 onto backup tunnel T2 and reroute portion/subset 602b of traffic 602 onto backup tunnel T3. For example, portion 602a may comprise the voice application traffic from traffic 602 and portion 602b may comprise the traffic for the remaining applications from traffic 602. Thus, even though traffic 602 could not be rerouted in its entirety to a single backup tunnel, the effects of the predicted failure of tunnel T1 can nevertheless be avoided by rerouting its constituent flows onto suitable backup tunnels.

Referring again to FIG. 5, another potential component of architecture 500 is what-if performance evaluation (WPE) module 508. After device 308 initiates a traffic reroute, WPE module 508 may aggressively monitor the health of the tunnel(s). Note that if system resources are sparse, device 308 may not initiate an aggressive monitoring mode. To test the performance of the backup tunnels(s) post-reroute, device 308 could measure the tunnel health (e.g., loss, latency, jitter) and the SLAB at a high frequency (e.g., every 500 ms), to observe any SLA changes. In another embodiment, the edge device 308 may initiate Deep-Packet Inspection (DPI) for the application(s) on the tunnel, if system resources permit it. DPI provides packet flow data at a fine granularity that can be used by WPE module 508 to monitor the application health.

If WPE module 508 determines that the SLA characteristics are not satisfied after the reroute, it may then send the entire fine granular data about tunnel health and DPI data (e.g., as part of information 510 provided to supervisory service 310. Doing so may trigger WILM 504 to retrain the what-if model 412, leading to the performance of the model improving over time. In another embodiment, WPE module 508 may also request network stress tester 506, detailed below, to stress test one or more of the tunnels, to improve the accuracy of the what-if model 412.

The final component of architecture 500 is network stress tester 506 which is configured to stress test tunnels, for purposes of obtaining information 510 for the training of the what-if model 412 by WILM 504. In general, network stress tester 506 may only perform stress testing on tunnels that are stable and not predicted to fail by the failure prediction model. Generally, such stress testing may entail sending additional traffic, either actual traffic or synthetically generated traffic, along a tunnel, to identify the point at which the tunnel no longer satisfies the SLA of interest. In one embodiment, network stress tester 506 may store all of the false-positives of the what-if model 412 in which the SLAs were not satisfied after the reroute triggered by WM module 502. This data, along with the input network state before the reroute can be used by network stress tester 506 to identify tunnels where stress tests could be initiated.

Network stress tester 506 may identify tunnels for stress testing based on any or all of the following: (1) whether the tunnel has an initial network state similar to the backup tunnel onto which the traffic was rerouted, (2) the other tunnel has application(s) similar to those rerouted, and/or (3) tunnel failure is not probable on the tunnel to undergo stress testing. In some cases, network stress tester 506 may use machine learning pattern recognition to identify tunnels that match these criteria. For example, network stress tester 506 can encode the network state as vector of values. In turn, network stress tester 506 can use a K-nearest neighbors algorithm to find tunnels that match the tunnel associated with the false positive by the what-if model. For all of the nearest tunnels matched, network stress tester 506 may next search, using the same K-nearest neighbor algorithm, for a subset of tunnels where there is an application on another tunnel (on the edge) that can be rerouted. Of course, network stress tester 506 could also use other algorithms instead of directly using K-nearest neighbors. For example, the entire network state can be embedded in a low-dimension, using autoencoders, and network stress tester 506 can search this space for k-nearest neighbors, in a further embodiment.

Figure 7:
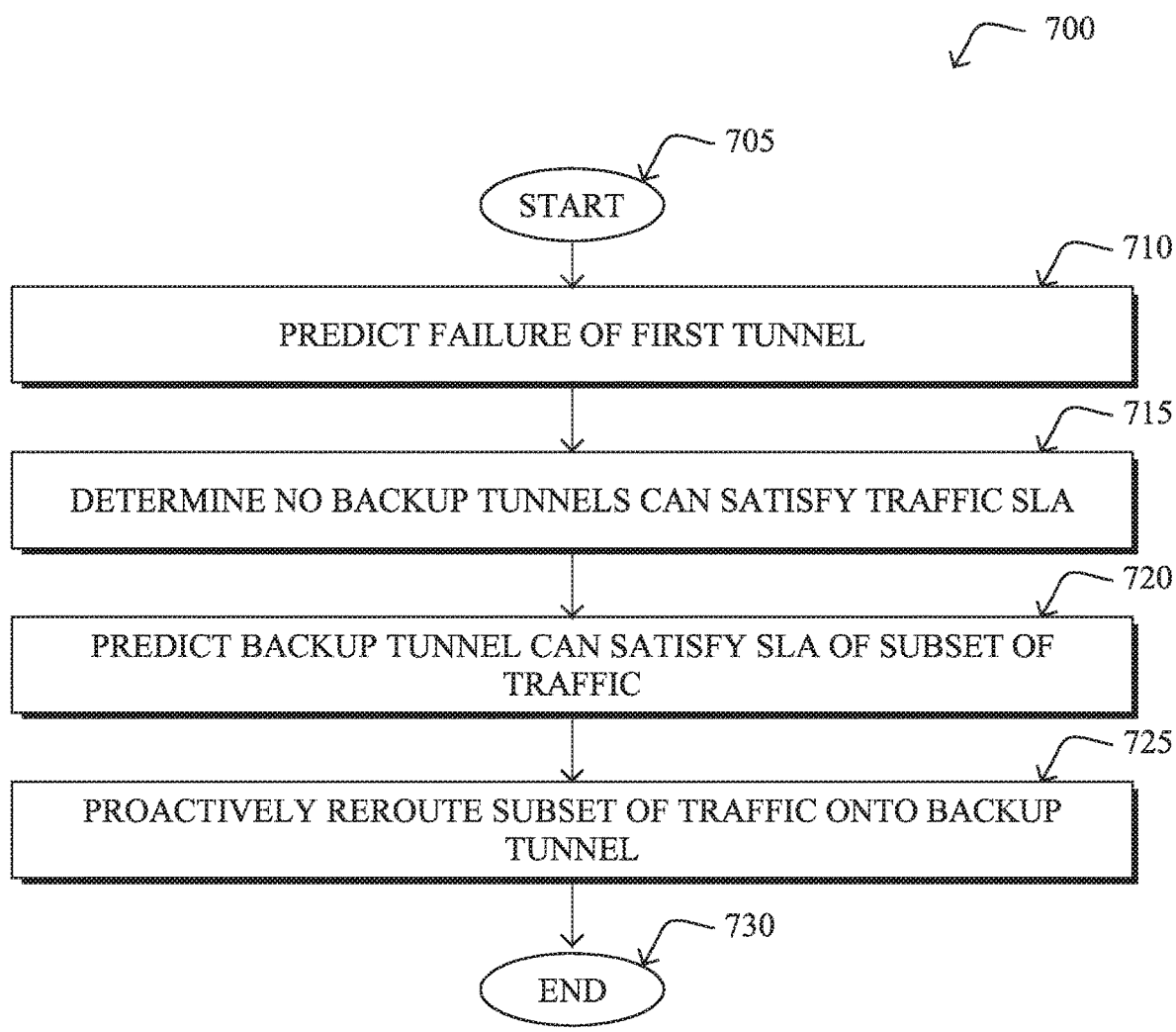
FIG. 7 illustrates an example simplified procedure for the partial rerouting of is traffic onto backup tunnels using predictive rerouting.

FIG. 7 illustrates an example simplified procedure for the partial rerouting of traffic onto backup tunnels using predictive rerouting, in accordance with one or more embodiments described herein. For example, a non-generic, specifically configured device (e.g., device 200) may perform procedure 700 by executing stored instructions (e.g., process 248). For example, the device may be an edge router of an SD-WAN and/or a device in communication therewith, to implement predictive routing in the network. As shown, the procedure 700 may start at step 705 and continue on to step 710 where, as described in greater detail above, the device may predict a failure of a first tunnel in the SD-WAN.

At step 715, as detailed above, the device may determine that no backup tunnel for the first tunnel exists in the SD-WAN that can satisfy one or more service level agreements (SLAs) of traffic on the first tunnel, were the traffic rerouted from the first tunnel onto that tunnel. For example, the device may leverage a what-if model trained to predict whether rerouting the whole traffic from the first tunnel onto a backup tunnel will continue to satisfy the SLA(s) of the traffic.

At step 720, the device may predict, using a machine learning model, that a backup tunnel for the first tunnel exists in the SD-WAN that can satisfy an SLA of a subset of the traffic on the first tunnel, as described in greater detail. The device may do so, for example, in response to determining that no backup tunnel exists in the SD-WAN that can satisfy the one or more SLAs of the traffic on the first tunnel. Various possibilities exist with respect to this prediction. In some embodiments, the selected subset may correspond to traffic for a particular application (e.g., voice, etc.). For example, the model may leverage binary/mixed-integer programming, to ensure that either all or none of an application's traffic from the first tunnel are included in the subset when making the prediction. In other embodiments, the prediction may entail the model determining a maximum amount of traffic that can be rerouted onto the backup tunnel while satisfying the SLA of the rerouted amount of traffic.

At step 725, as detailed above, the device may proactively reroute the subset of the traffic on the first tunnel onto the backup tunnel, in advance of the predicted failure of the first tunnel. In doing so, the traffic can be protected from being impacted by the failure. As would be appreciated, the above steps can be repeated any number of times and across any number of backup tunnels, to distribute portions/subsets of the traffic on the tunnel predicted to fail onto other backup tunnels that are predicted to satisfy the SLA(s) of the rerouted traffic. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the partial rerouting of traffic from a tunnel predicted to fail to one or more other backup tunnels. In some aspects, the techniques herein can also be used to ensure that the rerouting is done in a way that will continue to satisfy the SLA(s) of the rerouted subset(s).

While there have been shown and described illustrative embodiments that provide for predictive routing in a network, it is to be understood that various other adaptations and modifications may be made within the spirit and scope of the embodiments herein. For example, while certain embodiments are described herein with respect to using certain models for purposes of predicting failures or evaluating what-if scenarios, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   predicting, by a device, a failure of a first tunnel in a software-defined wide area network (SD-WAN);
   determining, by the device, that no backup tunnel for the first tunnel exists in the SD-WAN that can satisfy one or more service level agreements (SLAs) of traffic on the first tunnel, were the traffic rerouted from the first tunnel onto another tunnel;
   predicting, by the device and using a machine learning model, that a backup tunnel for the first tunnel exists in the SD-WAN that can satisfy an SLA of a subset of the traffic on the first tunnel, in response to determining that no backup tunnel exists in the SD-WAN that can satisfy the one or more SLAs of the traffic on the first tunnel; and
   proactively rerouting, by the device, the subset of the traffic on the first tunnel onto the backup tunnel, in advance of the predicted failure of the first tunnel.

2. The method as in claim 1, further comprising:
   monitoring, by the device and after rerouting the subset of the traffic onto the backup tunnel, performance metrics of the backup tunnel; and
   determining, by the device, whether the backup tunnel satisfies the SLA of the subset of the traffic, based on the monitored performance metrics of the backup tunnel.

3. The method as in claim 2, further comprising:
   initiating, by the device, retraining of the machine learning model, based on a determination that the backup tunnel does not meet the SLA of the subset of the traffic rerouted onto the backup tunnel.

4. The method as in claim 1, further comprising:
   selecting the subset of the traffic for rerouting onto the backup tunnel based in part on a priority associated with the subset.

5. The method as in claim 1, wherein the machine learning model is trained to determine a maximum amount of traffic that can be rerouted onto the backup tunnel while satisfying the SLA of the rerouted amount of traffic.

6. The method as in claim 1, wherein the subset of the traffic rerouted onto the backup tunnel is associated with a particular application.

7. The method as in claim 6, wherein the machine learning model uses binary/mixed-integer programming to force inclusion of all of the traffic on the first tunnel associated with the particular application into the subset when making the prediction that the backup tunnel can satisfy the SLA of the subset.

8. The method as in claim 1, wherein the machine learning model uses a greedy algorithm with an initially empty traffic vector, to make the prediction.

9. An apparatus, comprising:
   one or more network interfaces to communicate with a software-defined wide area network (SD-WAN);
   a processor coupled to the network interfaces and configured to execute one or more processes; and
   a memory configured to store a process executable by the processor, the process when executed configured to:
   predict a failure of a first tunnel in the SD-WAN;
   determine that no backup tunnel for the first tunnel exists in the SD-WAN that can satisfy one or more service level agreements (SLAs) of traffic on the first tunnel, were the traffic rerouted from the first tunnel onto another tunnel;
   predict, using a machine learning model, that a backup tunnel for the first tunnel exists in the SD-WAN that can satisfy an SLA of a subset of the traffic on the first tunnel, in response to determining that no backup tunnel exists in the SD-WAN that can satisfy the one or more SLAs of the traffic on the first tunnel; and
   proactively reroute the subset of the traffic on the first tunnel onto the backup tunnel, in advance of the predicted failure of the first tunnel.

10. The apparatus as in claim 9, wherein the process when executed is further configured to:
    monitor, after rerouting the subset of the traffic onto the backup tunnel, performance metrics of the backup tunnel; and
    determine whether the backup tunnel satisfies the SLA of the subset of the traffic, based on the monitored performance metrics of the backup tunnel.

11. The apparatus as in claim 10, wherein the process when executed is further configured to:
    initiate retraining of the machine learning model, based on a determination that the backup tunnel does not meet the SLA of the subset of the traffic rerouted onto the backup tunnel.

12. The apparatus as in claim 9, wherein the process when executed is further configured to:
    select the subset of the traffic for rerouting onto the backup tunnel based in part on a priority associated with the subset.

13. The apparatus as in claim 9, wherein the machine learning model is trained to determine a maximum amount of traffic that can be rerouted onto the backup tunnel while satisfying the SLA of the rerouted amount of traffic.

14. The apparatus as in claim 9, wherein the subset of the traffic rerouted onto the backup tunnel is associated with a particular application.

15. The apparatus as in claim 14, wherein the machine learning model uses binary/mixed-integer programming to force inclusion of all of the traffic on the first tunnel associated with the particular application into the subset when making the prediction that the backup tunnel can satisfy the SLA of the subset.

16. The apparatus as in claim 9, wherein the machine learning model uses a greedy algorithm with an initially empty traffic vector, to make the prediction.

17. The apparatus as in claim 8, wherein the apparatus is a head-end router of the first tunnel.

18. A tangible, non-transitory, computer-readable medium storing program instructions that cause a device in a software-defined wide area network (SD-WAN) to execute a process comprising:

predicting, by the device, a failure of a first tunnel in the SD-WAN;

determining, by the device, that no backup tunnel for the first tunnel exists in the SD-WAN that can satisfy one or more service level agreements (SLAs) of traffic on the first tunnel, were the traffic rerouted from the first tunnel onto another tunnel;

predicting, by the device and using a machine learning model, that a backup tunnel for the first tunnel exists in the SD-WAN that can satisfy an SLA of a subset of the traffic on the first tunnel, in response to determining that no backup tunnel exists in the SD-WAN that can satisfy the one or more SLAs of the traffic on the first tunnel; and proactively rerouting, by the device, the subset of the traffic on the first tunnel onto the backup tunnel, in advance of the predicted failure of the first tunnel.

19. The computer-readable medium as in claim 18, wherein the process further comprises:

monitoring, by the device and after rerouting the subset of the traffic onto the backup tunnel, performance metrics of the backup tunnel; and determining, by the device, whether the backup tunnel satisfies the SLA of the subset of the traffic, based on the monitored performance metrics of the backup tunnel.

20. The computer-readable medium as in claim 18, wherein the machine learning model is trained to determine a maximum amount of traffic that can be rerouted onto the backup tunnel while satisfying the SLA of the rerouted amount of traffic.

\* \* \* \* \*

UNITED STATES PATENT AND TRADEMARK OFFICE
CERTIFICATE OF CORRECTION

PATENT NO. : 11,474,894 B2  
APPLICATION NO. : 16/429379  
DATED : October 18, 2022  
INVENTOR(S) : Pierre-Andre Savalle Page 1 of 1

It is certified that error appears in the above-identified patent and that said Letters Patent is hereby corrected as shown below:

In the Specification

Column 2, Line 2, please amend as shown:
partial rerouting of traffic onto backup tunnels using Column 16, Line 35, please amend as shown:
WILM 504 and pushed to WIE module 502 for execution. If Column 18, Line 44, please amend as shown:
mon Internet File System (CIFS) application traffic, and Column 18, Line 62, please amend as shown:
SLAs of traffic 602 as a whole, it may nonetheless be able Column 19, Line 21, please amend as shown:
the performance of the backup tunnel(s) post-reroute, Column 19, Line 23, please amend as shown:
latency, jitter) and the SLAs at a high frequency (e.g., every, Column 19, Line 52, please amend as shown:
not satisfied after the reroute triggered by WIE module 502.

Signed and Sealed this  
Twenty-fourth Day of January, 2023

Katherine Kelly Vidal  
*Director of the United States Patent and Trademark Office*